(12) United States Patent
Yao et al.

(10) Patent No.: US 7,633,272 B2
(45) Date of Patent: Dec. 15, 2009

(54) LOAD-OFF TRANSIENT ACCELERATION GENERATOR CONTROL SYSTEM

(75) Inventors: Yuan Yao, Mississauga (CA); Wally A. Malicki, Rockwood (CA); Randy J. Fuller, Hillsburgh (CA)

(73) Assignee: Honeywell International Inc., Morristown, NJ (US)

( * ) Notice: Subject to any disclaimer, the term of this patent is extended or adjusted under 35 U.S.C. 154(b) by 294 days.

(21) Appl. No.: 11/776,023

(22) Filed: Jul. 11, 2007

(65) Prior Publication Data

US 2009/0072797 A1 Mar. 19, 2009

(51) Int. Cl.
*H02P 9/00* (2006.01)
(52) U.S. Cl. .................. 322/59; 322/25; 322/37
(58) Field of Classification Search ............ 322/22, 322/23, 24, 25, 37, 20, 59; 323/272; 361/64
See application file for complete search history.

(56) References Cited

U.S. PATENT DOCUMENTS

| | | | | |
|---|---|---|---|---|
| 4,623,833 A | * | 11/1986 | Edwards | 322/28 |
| 5,581,172 A | * | 12/1996 | Iwatani et al. | 322/28 |
| 5,583,420 A | * | 12/1996 | Rice et al. | 322/25 |
| 5,801,516 A | * | 9/1998 | Rice et al. | 322/37 |
| 6,184,661 B1 | * | 2/2001 | Becker et al. | 322/25 |
| 6,353,307 B1 | | 3/2002 | Koelle et al. | |
| 6,696,820 B2 | * | 2/2004 | Peter | 322/24 |
| 6,876,177 B2 | | 4/2005 | Namuduri et al. | |
| 7,005,833 B2 | | 2/2006 | Adams | |
| 7,064,524 B2 | * | 6/2006 | Yao | 322/25 |
| 7,106,030 B2 | * | 9/2006 | Isurin et al. | 322/59 |
| 7,196,498 B2 | * | 3/2007 | Yao | 322/25 |
| 7,282,893 B2 | * | 10/2007 | Yao | 322/37 |

FOREIGN PATENT DOCUMENTS

EP 0438884 7/1991

* cited by examiner

*Primary Examiner*—Nicholas Ponomarenko
(74) *Attorney, Agent, or Firm*—Oral Caglar, Esq.

(57) ABSTRACT

An electric generator is operated under conditions in which rapid off-loading may occur. A generator control unit (GCU) employs a detector to detect rates of change of output of the generator. In response to a rapid change of output, e.g. an off-loading, an overvoltage protection system is activated. Excess energy stored in an excited winding is directed into an impedance circuit thus precluding overvoltage that may have been produced by the excess energy.

6 Claims, 2 Drawing Sheets

LOAD-OFF TRANSIENT ACCELERATION GENERATOR CONTROL SYSTEM

BACKGROUND OF THE INVENTION

The present invention is in the field of electrical generators and, more particularly, electrical generators which operate under rapidly varying load conditions.

Generators used in aircraft or space vehicles are often operated under variable load conditions. Typically, these generators are provided with regulators that modulate generator field current based on a detected voltage at a point of regulation (a POR). This detected voltage is referred to as a POR voltage. In many applications of these variable load generators, a POR voltage must be maintained within narrowly defined limits. Failure to maintain a POR voltage at a desired level may result in damage to equipment to which the generator supplies power.

In many aircraft or spacecraft applications, electrical generators are subjected to widely varying and rapidly changing load conditions. When load is rapidly removed from a generator, it is difficult to prevent POR voltage from rising above a desired level. This is because rapid removal of load requires rapid reduction of current in the exciter winding to keep the POR voltage within the desired limit. However, the exciter winding current cannot be reduced to zero instantly due to the inductive nature of the winding. A residual amount of energy in an exciter winding of the generator continues circulating through a freewheeling diode for a short time and this energy contributes to a short-term rise in POR voltage. In the prior art, this residual energy has been discharged into an impedance circuit when POR voltage rises as a result of a rapid off-loading of the generator. One particularly, effective technique for discharging this residual energy is described in U.S. Pat. No. 6,628,104, issued to Yuan Yao et al. on Sep. 30, 2003.

But, even with availability of sophisticated discharging techniques for residual exciter energy, there still remains a problem in the maintenance of POR voltage during rapid load-off conditions. In the prior art, energy discharging systems have been activated or triggered in response to signals from voltage detectors. When a POR voltage rose above a predetermined level during load reduction, the discharge system would be triggered. But a triggering technique based on measuring POR voltage is inherently limited in the degree of precision with which POR voltage may be controlled. Such a technique requires that triggering not occur at a voltage that is at or below the predetermined POR voltage level. Triggering may only occur after POR voltage exceeds the predetermined POR voltage level.

After triggering is performed there is an inherent time delay before POR voltage is effectively reduced by discharging the residual energy. During this time delay POR voltage continues to rise. This presents a doubly problematic situation. First of all, as stated above, a triggering voltage threshold must be selected which is higher than the desired POR. Secondly, there must be consideration given to the fact that POR voltage will rise even higher during a time delay after triggering. In the prior art there has never been a generator control system that completely precludes an overvoltage condition from developing during a rapid load-off event.

Consequently, any equipment driven by the prior-art generators must be robust enough to tolerate a POR overvoltage without being damaged. This of course means that the driven equipment must be built with a certain factor of safety. This translates into undesirable increases in size and weight of the equipment. Excessive size and weight are properties that must be avoided in aircraft and spacecraft equipment.

As can be seen, it would be desirable to provide electrical generators in which precise control of POR voltage may be maintained during rapid load varying conditions. In particular, it would be desirable to provide a control system which precludes an overvoltage at the point of regulation during a rapid load-off event.

SUMMARY OF THE INVENTION

In one aspect of the present invention an electrical generator with a field discharging system comprises a detection unit adapted to trigger operation of the field-discharging system. The detection unit comprises a detector responsive to a rate of change of generator output.

In another aspect of the present invention a load-off protection system for an electrical generator comprises a first detector responsive to POR voltage of the generator, a second detector responsive to a rate of change of generator output, and a field current discharging system responsive to an activation signal that is produced when the first detector detects a baseline voltage and the second detector produces a do/dt signal when a threshold rate of change of output is detected.

In still another aspect of the present invention a method for controlling an electrical generator comprising the steps of detecting a rate of change of output of the generator and discharging field current when the rate of change of output reaches a predetermined value.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in electrical generators which operate under variable load conditions. More particularly, the present invention may provide a control system for a generator which may preclude an overvoltage condition during a rapid load-off event. The present invention may be particularly useful in vehicles such as aircraft and spacecraft. In such vehicles, avoidance of overvoltage may contribute to low weight and size of equipment driven by the subject electrical generators.

In contrast to prior-art electrical generators, among other things, the present invention may provide an overvoltage control system which does not depend only on detecting of POR voltage to control overshooting of POR voltage during load-off events. The present invention, instead of only utilizing POR voltage detecting, may utilize detecting of a rate of change of field current or a rate of change of POR voltage to initiate overvoltage control. These desirable improvements of an electrical generator and a method of operating such a generator may be achieved by constructing and operating a generator in an inventive configuration illustrated in FIG. 1 and an inventive method illustrated in FIG. 2.

Figure 1:
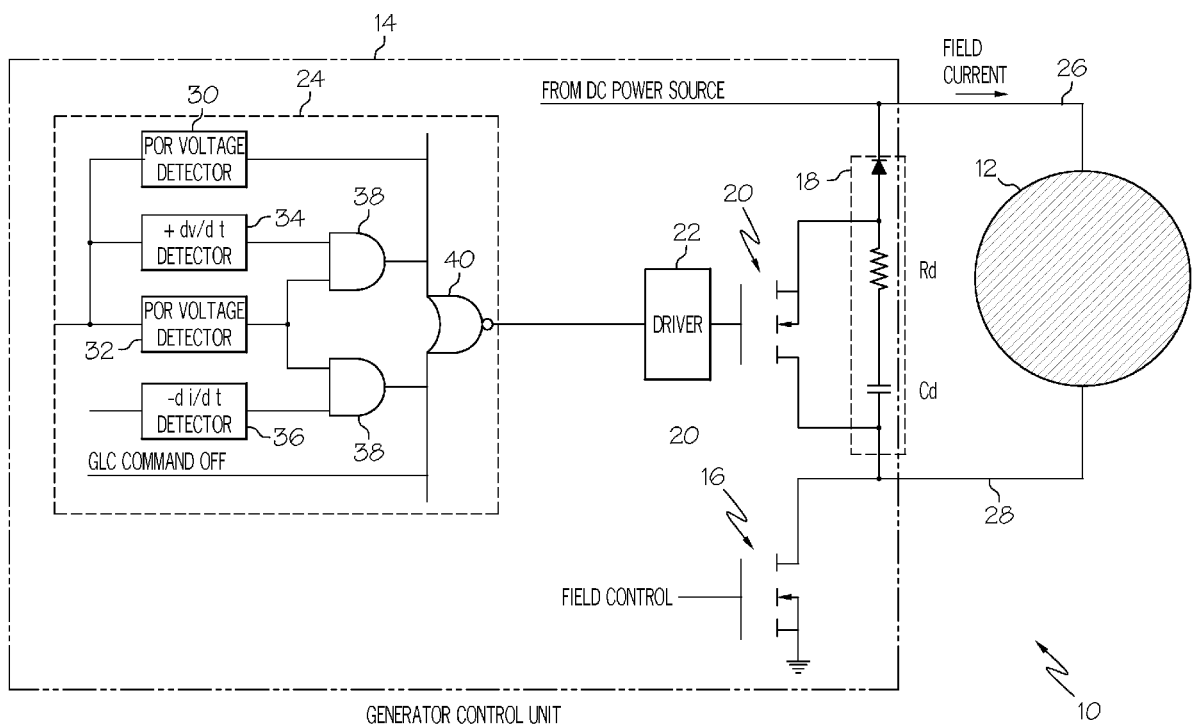
FIG. 1 is a block diagram of load-off protection system in accordance with the invention.

Referring now to FIG. 1, an electrical generator assembly 10 may comprise a conventional generator 12 and an inventive generator control unit 14 (hereinafter GCU 14). The GCU 14 may comprise a field-current modulation switch 16, an impedance circuit 18, a bypass switch 20, a driver 22 and a detection unit 24. In operation the GCU 14 may provide control of current passing through an exciter of the generator 12. Field current may pass into and out of the GCU 14 on conductors 26 and 28. The field current modulation switch 16, the impedance circuit 18, the bypass switch 20 and the driver 22 may cooperatively function to vary field current as needed to maintain a desired regulated output voltage from the generator 12, i.e. a so-called point of regulation voltage or POR voltage, Cooperative functioning of the field current modulation switch 16, the impedance circuit 18, the bypass switch 20 and the driver 22 may occur as described in U.S. Pat. No. 6,628,104 which is incorporated herein by reference.

The detection unit 24 may provide signals to the driver 22 and the bypass switch 20 so that the impedance circuit 18 may be activated as needed to prevent POR overvoltage during variations in load conditions of the generator assembly 10. The detection unit 24 may comprise first and second POR voltage detectors 30 and 32, a voltage rate of change detector 34 and a current rate of change detector 36. The detection unit 24 may also comprise one or more AND gates 38 and an OR gate 40. In operation the detection unit 24 may produce a signal that activates the impedance circuit 18 during events which may produce a POR overvoltage.

An impedance-circuit activation signal may be produced by the detection unit 24 under conditions which may be detected by one or more of the detectors 30-36. For example, the detection unit 24 may produce such an activation signal when a POR overvoltage is detected by the first POR voltage detector 30. Or the unit 24 may produce an activation signal if, as described in U.S. Pat. No. 6,628,104, a Generator Load Contactor is released to remove load from the generator and its command signal (GLC Command) is off. In both of these circumstances the detection unit 24 may be considered to be operating in a conventional manner.

But, the detection unit 24 may incorporate inventive functionality along with the conventional functionality described above. In that regard, the detection unit 24 may employ the second POR voltage detector 32 in conjunction with the detector 34 and/or the detector 36 to produce the activation signal. The detector 32, which detects a rate of change of the POR voltage, (dv/dt), may produce a signal when dv/dt reaches or exceeds a predetermined threshold rate of change, i.e. a dv/dt signal. A dv/dt signal may be combined, in one of the AND gates 38, with a signal from the second POR voltage detector 32. The second POR voltage detector may have a threshold level lower than threshold level of the first POR voltage detector 30. A signal may be produced by the detector 32 at all times that the POR voltage meets or exceeds a predetermined baseline threshold (e.g. about 90% to about 100% of a desired POR voltage). Consequently the signal produced by the second POR voltage detector 32 may be referred to as a baseline signal. The baseline POR voltage may be lower than the desired POR voltage of the generator assembly 10.

It may be seen that if a condition exists in which POR voltage is equal to or greater than the baseline threshold and there is a dv/dt signal, then an activation signal may be produced. Conversely, presence of a dv/dt signal in the absence of a baseline signal is an insufficient condition for producing an activation signal In the above described logical arrangement, an activation signal may be produced whenever a generator load change produces a rapid change in POR voltage, but only if the POR voltage is at or above a baseline threshold. This logical arrangement provides a desired activation signal when load changes occur during steady state operation of the generator assembly 10. If the generator assembly 10 is in a start-up mode with an associated rapid increase in POR voltage, it may be inappropriate to activate the impedance circuit 18. Combining signals from the detectors 32 and 34 in one of the AND gates 38 may avoid this anomalous result.

It may also be seen that when signals from the detectors 32 and 34 are combined as described above, the impedance circuit 18 may be activated at a POR voltage which does not necessarily exceed or even reach a desired POR voltage of the generator assembly 10. This represents a departure over the prior art wherein POR voltage was required to exceed a desired POR voltage before corrective action could be taken to reduce an overvoltage condition.

In FIG. 1, one of the AND gates 38 may combine signals from the second POR voltage detector 32 and the rate of change of current detector 36. The detector 36 may produce a signal, a di/dt signal, whenever a rate of change of a detected current reaches or exceeds an established threshold. The detector 36 may detect a rate of change of the field current in the conductors 26 and/28, or alternatively the detector 36 may detect a rate of change of output current of the generator assembly 10. A combination of the detectors 32 and 36 may operate with the same logical scheme described above with respect to the combination of detectors 32 and 34, The detector unit 24 may operate successfully if it includes either of the detectors 34 or 36. In other words, a desired control of POR overvoltage may achieved by using only the dv/dt signal combined with the baseline signal. Similarly, the desired control of POR overvoltage may be achieved by using only the di/dt signal combined with the baseline signal. Nevertheless it may be advantageous to incorporate both the detectors 34 and 36 into the detector unit 24. There may be conditions in which a rate of POR voltage change may be slower than a rate of current change. In such a case the rate of current change detector 36 would be the operative device to activate the impedance circuit 18. Conversely the current change may be slower than the POR voltage change. Then the detector 34 may be the operative device.

It may be seen that either or both of the detectors 34 and 36 may detect a rate of change of output of the generator assembly 10. In that regard either or both of the detectors 34 and 36 may be considered to be rate of output change detectors. Signals produced by either of these rates of output change detectors may be considered to be do/dt signals.

In an exemplary operation of the inventive control unit 14 the generator 10 may be operated with a desired POR voltage of 230 Vrms. A threshold voltage for the first POR voltage detector may be established at between about 240 Vrms and 250 Vrms. A baseline threshold voltage for the second POR voltage detector 32 may be established at about 210 Vrms and 230 Vrms. A threshold of about 10 to about 50 milliamps/millisecond may be established for the rate of change of current detector 36. A threshold of about 5 to about 20 volts/millisecond for the detector 34. At these values the POR voltage of the generator assembly 10 may not exceed 230 Vrms even if the generator assembly 10 may be subjected to off-loading that occurs a period of time as short as about 0.2 millisecond to about 1.0 millisecond.

Figure 2:
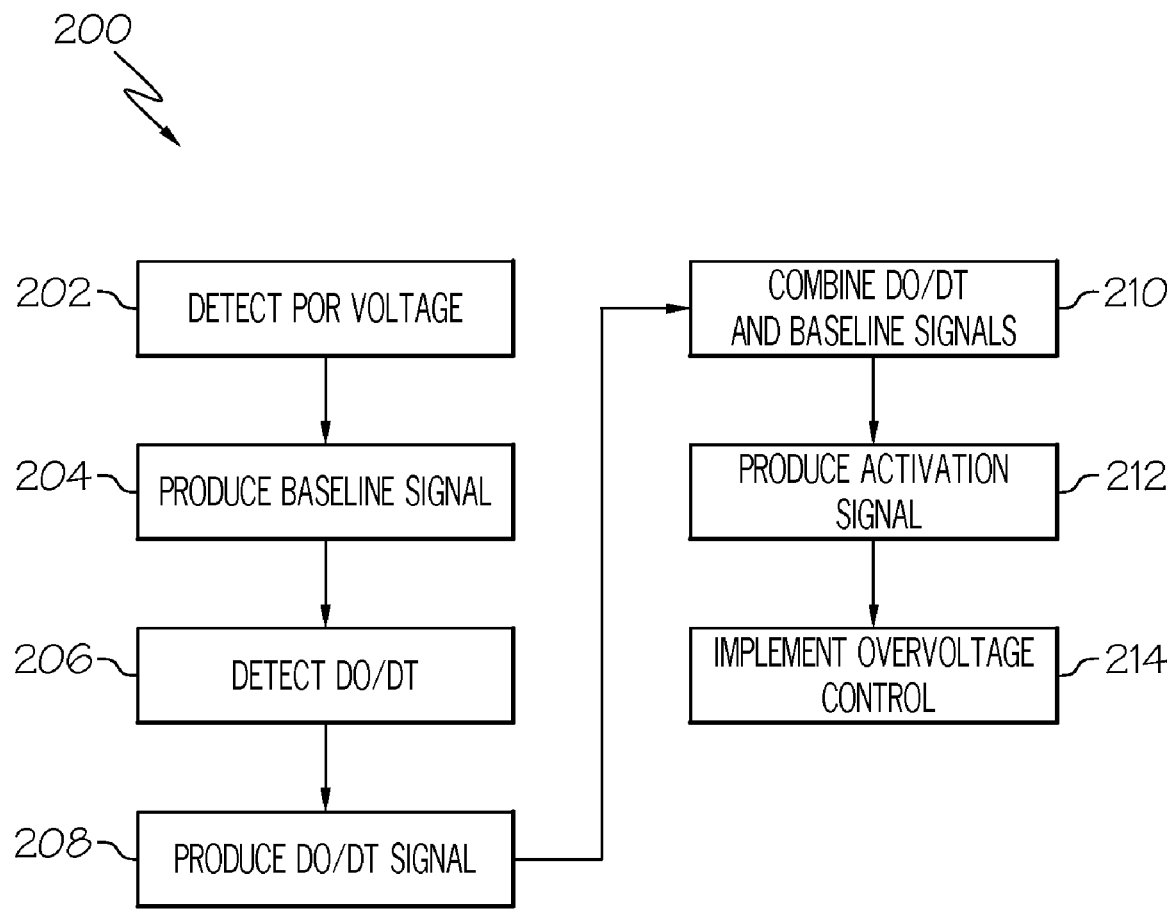
FIG. 2 is a flow chart of a method preventing load-off overvoltage in accordance with the present invention.

In one embodiment of the present invention, a method is provided for controlling an electric generator (e.g. the generator assembly 10). In that regard the method may be understood by referring to FIG. 2. In FIG. 2, a flow chart portrays various aspects of an inventive method 200. In a step 202 detecting of POR voltage is performed. In a step 204 a signal is produced if the detected POR voltage meets or exceeds an established baseline voltage (e.g. the baseline signal). In a step 206 a rate of change of output of the generator assembly is detected. In a step 208 a signal, (e.g. the do/dt signal) is produced if the rate of change of output reaches or exceeds an established threshold value. In a step 210 the do/dt signal and the baseline signal are combined (e.g. in the AND gate 38). In a step 212 an activation signal may be produced in response to combined baseline and do/dt signals. In a step 214 implementation of overvoltage control is performed in response to a signal from the AND gate (e.g. the activation signal).

It should be understood, of course, that the foregoing relates to exemplary embodiments of the invention and that modifications may be made without departing from the spirit and scope of the invention as set forth in the following claims.

We claim:

1. An electrical generator assembly with a field-discharging system comprising:
   the field-discharging system adapted to direct excess electrical energy stored in an exciter winding of a generator into an impedance circuit;
   a detection unit adapted to activate the field-discharging system and responsive to both a point of regulation voltage and a rate of change of generator output, the detection unit comprises;
   a detector responsive to the rate of change of generator output and POR voltage;
   wherein the detection unit is further adapted to activate the field-discharging system only when a detected point of regulation voltage is at least as high as about 90% to about 100% of a desired point of regulation voltage of a generator output.

2. The generator assembly of claim 1 wherein the detector responds to a rate of change of current.

3. The generator assembly of claim 1 wherein the detector responds to a rate of change of voltage.

4. The generator assembly of claim 1 wherein the detection unit comprises;
   a detector responsive to a rate of change of point of regulation voltage; and
   a detector responsive a rate of change of field current.

5. An electrical generator assembly with a field discharging system comprising:
   a detection unit adapted to activate the field-discharging system, the detection unit comprises;
   a detector responsive to a rate of change of a generator output;
   wherein:
   the detection unit is responsive to both a point of regulation voltage and a rate of change of the generator output; and
   the detection unit is adapted to activate the field-discharging system only when the detected point of regulation voltage is at least as high as about 90% to about 100% of a desired point of regulation voltage of the generator output.

6. An electrical generator assembly with a field discharging system comprising:
   a detection unit adapted to activate the field-discharging system, the detection unit comprises;
   a detector responsive to a rate of change of a generator output;
   wherein:
   the detection unit is responsive to both a point of regulation voltage and rate of change of POR voltage; and
   the detection unit is adapted to activate the field-discharging system only when a detected point of regulation voltage is at least as high as about 90% to about 100% of a desired point of regulation voltage of the generator output.

* * * * *